United States Patent [19]

Hayatsugu et al.

[11] Patent Number: 5,174,628
[45] Date of Patent: Dec. 29, 1992

[54] AUTOMOBILE REAR BODY STRUCTURE

[75] Inventors: Harasaki Hayatsugu; Sato Motoharu; Shibata Keiichiro, all of Hiroshima; Ikegami Makoto, Yokohama; Sagahara Takayuki; Konno Yoshihiro, both of Hiroshima, all of Japan

[73] Assignee: Mazda Motor Corporation, Hiroshima, Japan

[21] Appl. No.: 815,589

[22] Filed: Dec. 31, 1991

Related U.S. Application Data

[63] Continuation of Ser. No. 587,764, Sep. 26, 1990, abandoned.

[30] Foreign Application Priority Data

Sep. 30, 1989 [JP] Japan .................................. 1-255560
Sep. 30, 1989 [JP] Japan .................................. 1-255578

[51] Int. Cl.⁵ .......................................... B62D 25/20
[52] U.S. Cl. .................................... 296/188; 296/195; 296/204
[58] Field of Search ............... 296/188, 189, 204, 195; 280/834

[56] References Cited

U.S. PATENT DOCUMENTS

| | | | |
|---|---|---|---|
| 1,953,953 | 4/1934 | Carr | 280/834 X |
| 2,240,022 | 4/1941 | Saives | 296/198 X |
| 3,054,636 | 9/1962 | Wessells, III | 296/204 |
| 3,108,836 | 10/1963 | Deckert | 296/204 |
| 3,171,669 | 3/1965 | Barenyi | 296/188 X |
| 3,622,035 | 11/1971 | Suter | 280/834 |
| 3,661,419 | 5/1972 | Mitamura et al. | 296/195 X |
| 3,896,896 | 7/1975 | Saitoh | 296/189 X |
| 4,093,254 | 6/1978 | Ezaki | 280/834 X |
| 4,283,067 | 8/1981 | Weber et al. | 280/834 |
| 4,369,981 | 1/1983 | Chiba et al. | 280/834 |
| 4,416,461 | 11/1983 | Hayashi et al. | 280/834 |
| 4,950,031 | 8/1990 | Mizunaga et al. | 296/189 |

FOREIGN PATENT DOCUMENTS

| | | | |
|---|---|---|---|
| 2509351 | 9/1975 | Fed. Rep. of Germany | 296/189 |
| 2929704 | 2/1981 | Fed. Rep. of Germany | 280/834 |
| 1130427 | 2/1957 | France | 280/834 |
| 0199222 | 11/1983 | Japan | 280/834 |
| 0287822 | 12/1986 | Japan | 280/834 |

Primary Examiner—Dennis H. Pedder
Attorney, Agent, or Firm—Wenderoth, Lind & Ponack

[57] ABSTRACT

An automobile rear body structure includes generally juxtaposed rear side frames each extending longitudinally of the body structure and having a substantially intermediate portion upwardly raised clear from an associated rear wheel axle, such that the respective side frame has a generally horizontally extending front end portion, a generally rearwardly upwardly inclined portion, a generally rearwardly downwardly inclined portion and a generally horizontally extending rear end portion. A rear floor panel is mounted on the rear side frames and includes a floor panel portion laid on the horizontally extending front end portions of the side frames, a raised panel portion partially laid on the rearwardly upwardly inclined portions of the side frames, and a rear package tray portion extending horizontally in a direction rearwardly of the body structure and above the rearwardly upwardly and downwardly inclined portions of the side frames. At least one fuel tank is positioned behind the raised panel portion and beneath the rear package tray portion of the rear floor panel. Respective portions of the side frames extend laterally outwardly of opposite sides of the fuel tank, so that not only the panel members, but also those portions of the side frames can effectively protect the fuel tank from damage which would be brought about in the event of the end-to-side automobile collision.

7 Claims, 11 Drawing Sheets

AUTOMOBILE REAR BODY STRUCTURE

This application is a continuation of now abandoned application Ser. No. 07/587,764, filed Sep. 26, 1990 now abandoned.

BACKGROUND OF THE INVENTION

1. Field of the Invention

The present invention generally relates to an automobile body structure and, more particularly, to an automobile rear body structure.

2. Description of the Prior Art

In general an automobile rear body structure comprises a rear frame assembly extending longitudinally of an automobile and a rear floor panel mounted thereon.

Japanese Laid-open Utility Model Publication No. 63-37332, published in 1988, discloses the use of a rear floor extending rearwardly from a rear passengers seat assembly so as to raise upwardly towards a rear package tray through an upwardly raised rear floor portion with a fuel tank positioned beneath the upwardly raised rear floor portion. This type of automobile rear body structure such as disclosed in the above mentioned publication is advantageous in that the space delimited beneath the upwardly raised rear floor portion and above a ground surface on which the automobile runs can be effectively utilized to accommodate the fuel tank of substantially increased capacity which may not be generally flat in shape and which may be manufactured so as to have a required rigidity.

Also, attempts have hitherto been made to increase the capacity of the rear trunk compartment in the automobile body structure. For this purpose, each of generally juxtaposed rear side frame is upwardly raised at a location generally about an associated rear wheel housing so that a rear end portion of the respective rear side frame which is immediately below the bottom of the rear trunk compartment can be lowered thereby to increase the capacity of the rear trunk compartment.

However, this prior art automobile rear body structure has been found to have a problem in that, since the fuel tank is partially enclosed by panel members positioned on respective sides of the automobile rear body structure so as to define left-hand and right-hand rear wheel housings, the fuel tank cannot be sufficiently protected from damage which may occur in the event of an end-to-side automobile collision in which the front of one automobile collides against one side of another automobile.

In addition, according to the prior art, each of the side frame has a uniform rigidity substantially over the entire length thereof. Therefore, in the event that an excessive impact is applied to the rear body structure as a result of an end-to-end automobile collision, not only may the side frames be damaged in their entirety, but the upwardly raised portion of each side frame clear from an associated rear wheel axle may also be excessively deformed to such an extent as to destroy a required suspension geometry according to which rear wheel suspension systems are laid out. Once the rear wheel suspension geometry is destroyed, the automobile will no longer run on the ground surface.

SUMMARY OF THE INVENTION

Therefore, the present invention has been devised with a view to substantially eliminating the above discussed problem and has for its primary object to provide an improved automobile rear body structure so structured and so configured as to effectively protect the fuel tank from damage which would be incurred in the event of the end-to-side automobile collision.

Another important object of the present invention is to provide an improved automobile rear body structure wherein a design is made to render front and rear regions of each of the side frame to have a different sectional stiffness so that, in the event of the end-to-end automobile collision, the side frames can be positively buckled about the boundary between the front and rear regions thereof, thereby to minimize any possible damage which would otherwise be extended to rear wheel suspension systems and also to the fuel tank positioned in the vicinity of the rear wheel suspension systems.

In order to accomplish the above described objects, according to one aspect of the present invention, there is provided an automobile rear body structure which comprises generally juxtaposed rear side frames extending longitudinally of the body structure, a substantially intermediate portion of each of said side frames being upwardly raised clear from an associated rear wheel axle to render each side frame to have a generally horizontally extending front end portion, a generally rearwardly upwardly inclined portion, a generally rearwardly downwardly inclined portion and a generally horizontally extending rear end portion. The rear body structure also comprises a rear floor panel mounted on the rear side frames and including a floor panel portion laid on the generally horizontally extending front end portions of the side frames, a raised panel portion partially laid on the rearwardly upwardly inclined portions of the side frames, and a rear package tray portion extending generally horizontally in a direction rearwardly of the body structure and above the rearwardly upwardly and downwardly inclined portions of the side frames.

At least one fuel tank is positioned behind the raised panel portion and beneath the rear package tray portion of the rear floor panel. Respective portions of the side frames extend laterally outwardly of respective opposite sides of the fuel tank, so that not only the panel members, but also those portions of the side frames can effectively protect the fuel tank from damage which would be brought about in the event of the end-to-side automobile collision.

According to another aspect of the present invention, a difference in rigidity is provided between the respective front regions of the side frames and the respective rear regions of the same side frames. Therefore, in the event that, as a result of an end-to-end automobile collision in which the front of one automobile collides against the rear of another automobile, an excessive impact is applied to the rear of the automobile, the side frames can be effectively buckled generally at the boundary between the region of lower sectional rigidity in each side frame and the region of higher sectional rigidity in the respective frame, thereby minimizing the transmission of the impact towards the fuel tank and other parts of the automobile body structure which are positioned frontwardly of the boundary.

The presence of the difference in rigidity between the front and rear regions of each side frame effectively facilitates a buckling of the respective side frame to take place about the boundary therebetween, thereby to minimize damage which would otherwise extend towards the front of the automobile body structure and also to minimize damage to the suspension systems which would otherwise be deformed to such an extent as to result in a difficulty in restoring the suspension geometry. Important of all is that, according to the present invention, any possible damage to the fuel tank can also be minimized advantageously.

BRIEF DESCRIPTION OF THE DRAWINGS

These and other objects and features of the present invention will become clear from the following detailed description of preferred embodiments of the present invention made with reference to the accompanying drawings, in which.

DETAILED DESCRIPTION OF THE EMBODIMENTS

Figure 1:
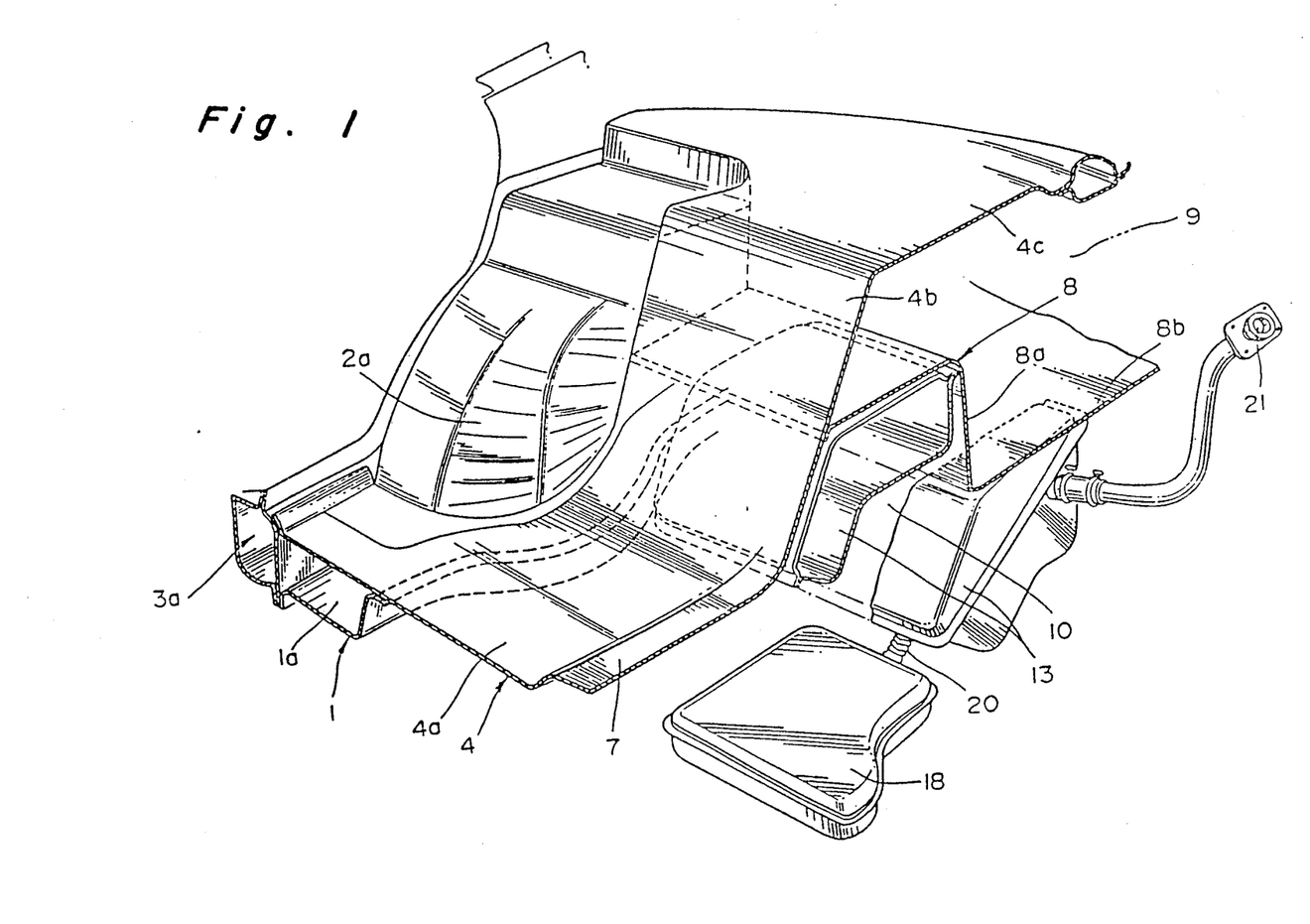
FIG. 1 is a perspective view, with a portion shown in section, of an automobile rear body structure according to a first preferred embodiment of the present invention.
Figure 2:
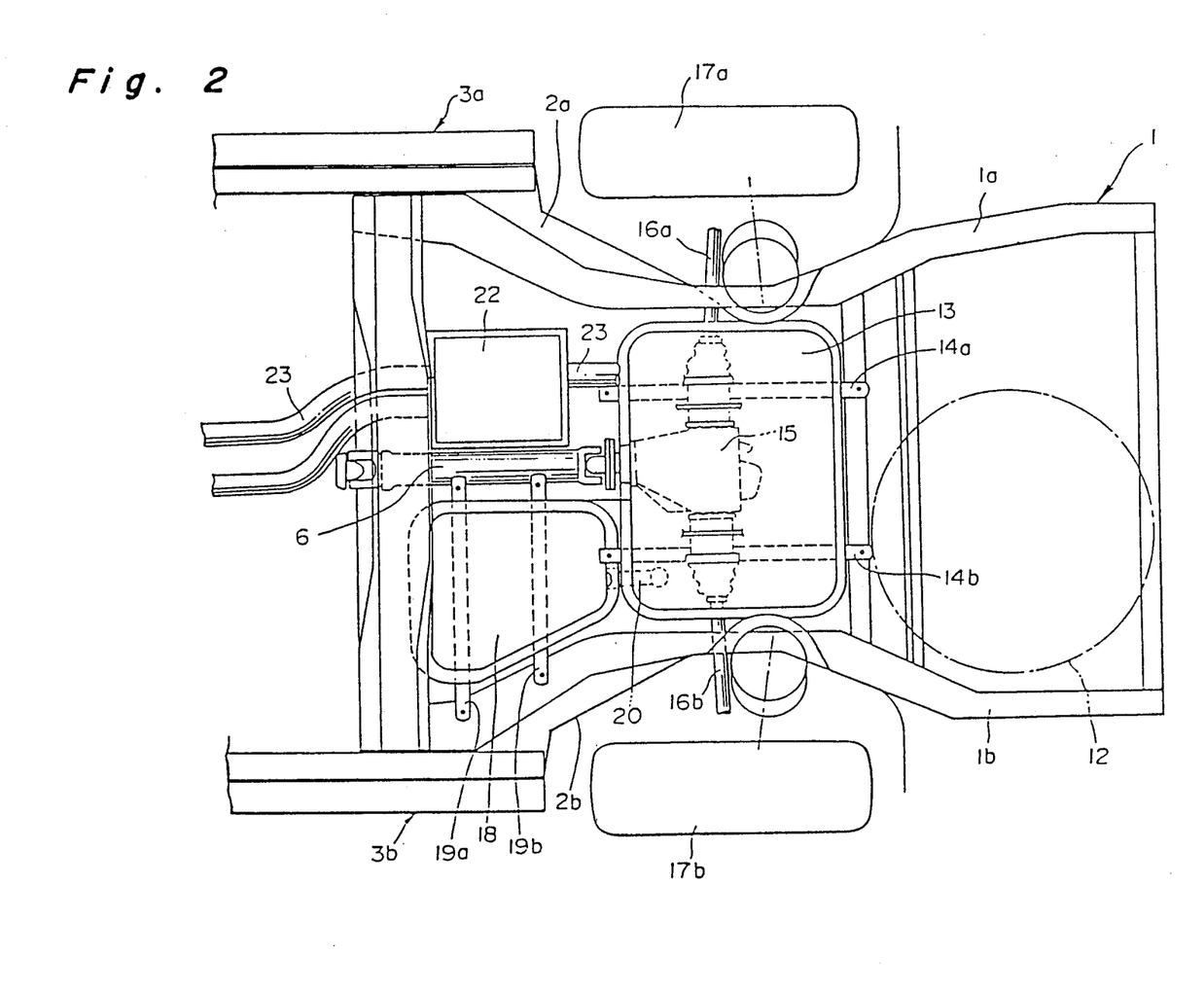
FIG. 2 is a top plan view, with a rear floor panel removed, of the automobile rear body structure according to the first preferred embodiment of the present invention.

Referring to FIGS. 1 to 14 in which a first preferred embodiment of the present invention is shown, an automobile rear body structure shown therein comprises a rear frame assembly 1 including, as best shown in FIG. 2, two spaced apart side frames 1a and 1b spaced a predetermined distance from each other and extending in a direction longitudinally rearwardly of the automobile body structure. Right-hand and left-hand rear wheel housings 2a and 2b are defined exteriorly of the respective side frames 1a and 1b and are connected with side sills 3a and 3b that extend therefrom in a direction longitudinally frontwardly of the automobile body structure. Side frames 1a and 1b have respective front ends rigidly connected to the associated side sills 3a and 3b.

Figure 3:
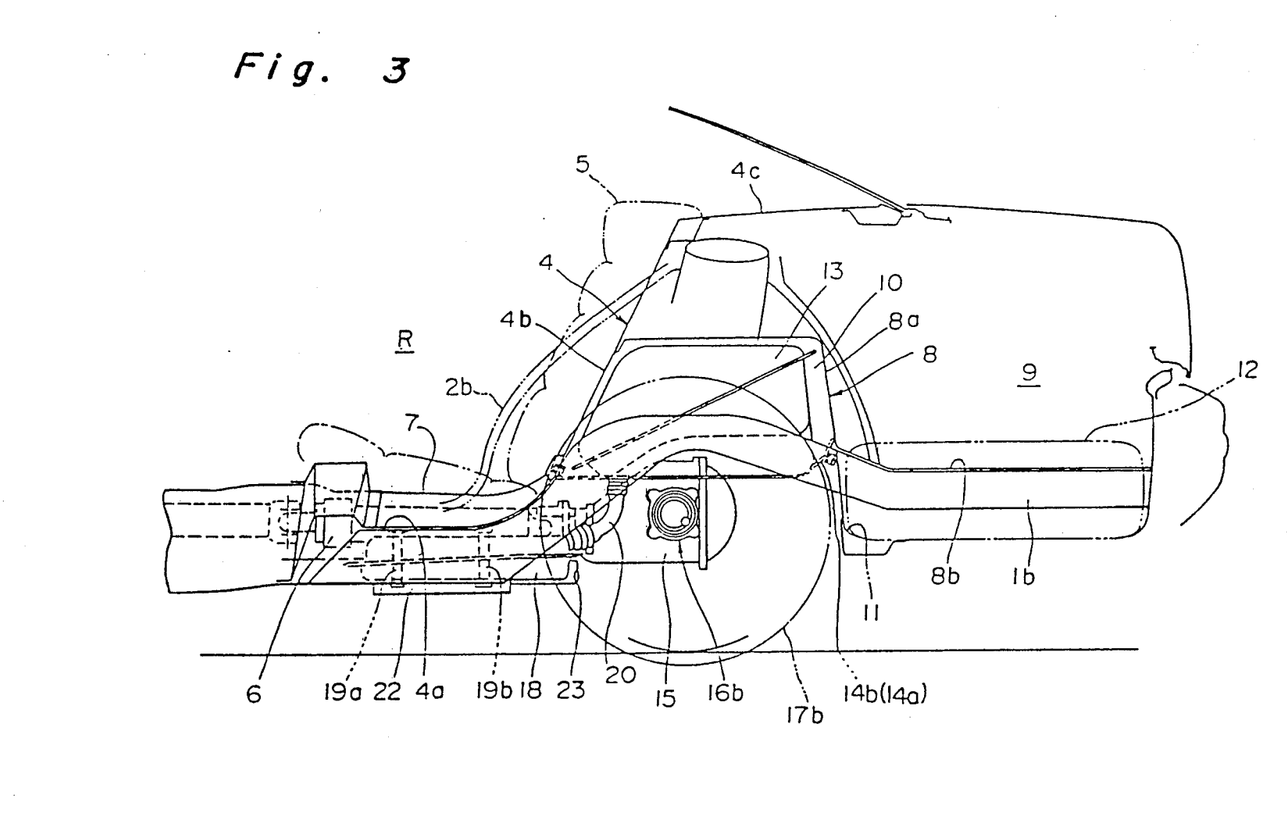
FIG. 3 is a side view of the automobile rear body structure.

As best shown in FIGS. 1 and 3, a shaped rear floor panel 4 is laid on the side sills 3a and 3b and, also, on the side frames 1a and 1b. This rear floor panel 4 is of one-piece construction comprising a floor panel portion 4a, an upwardly raised panel portion 4b continued from the floor panel portion 4a so as to extend generally upwardly therefrom, and a rear package tray portion 4c continued from the raised panel portion 4b so as to extend generally horizontally at a level above the floor panel portion 4a. The floor panel portion 4a extending generally horizontally is used for the support thereon of a rear passengers' seat assembly 5 and has a tunnel 7 defined therein so as to extend longitudinally of the automobile body structure for accommodating a drive shaft 6 therebelow, which tunnel 7 is positioned intermediate the width of the floor panel portion 4a. The raised panel portion 4b extends generally upwardly from the floor panel portion 4a, having been contoured to extend along and behind a seat back of the rear passengers' seat assembly 5, as best shown in FIG. 3, while separating away from the rear frame assembly 1. The raised panel portion 4b so shaped and so positioned as described above is bent to extend generally horizontally at a location about the height of the rear seat back thereby to define the rear package tray portion 4c.

Figure 4:
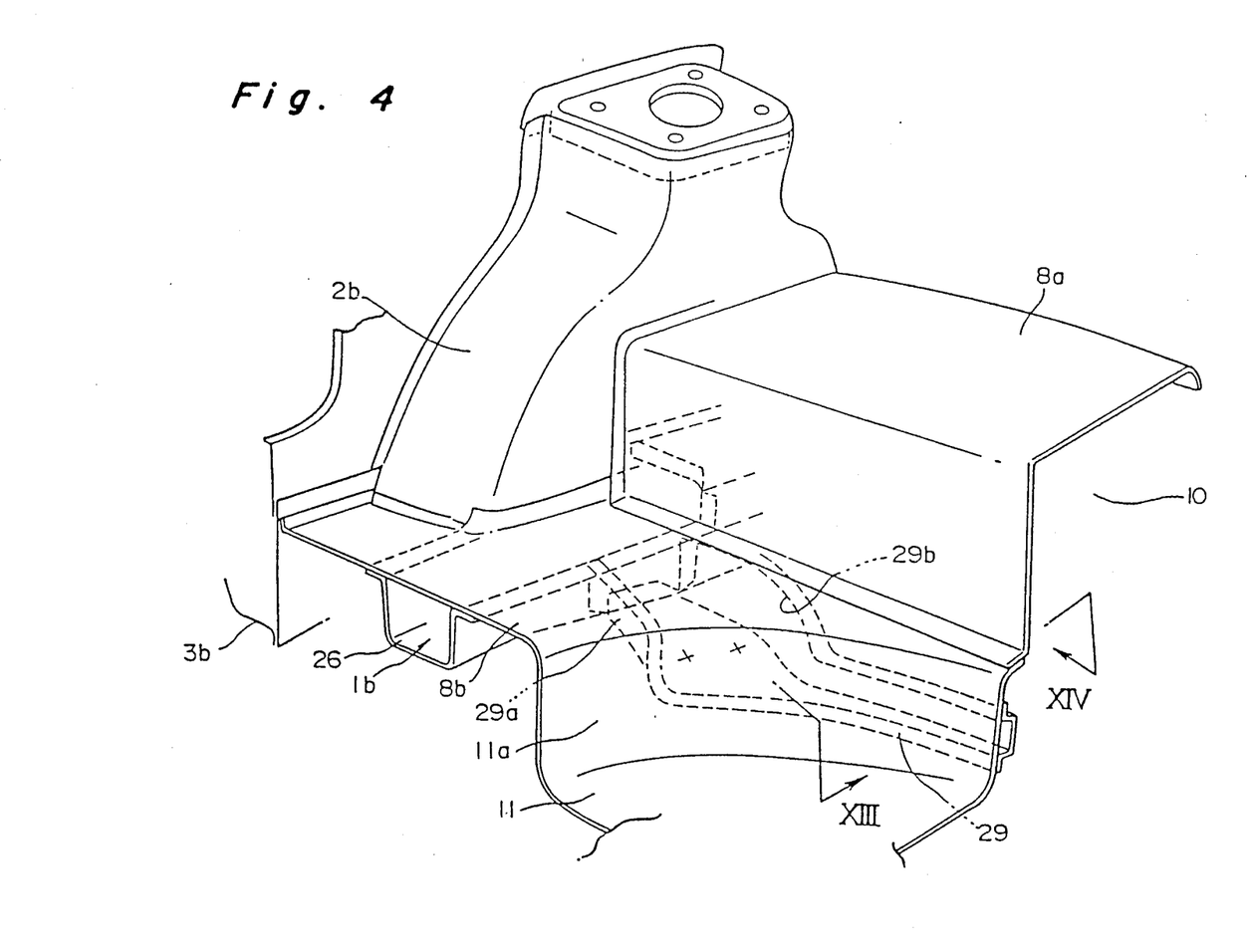
FIG. 4 is a perspective view of a right-hand rear portion of the automobile rear body structure as viewed from the rear.

As best shown in FIGS. 1, 3 and 4, a trunk defining panel 8 is positioned rearwardly of the raised panel portion 4b of the shaped floor panel 4 and includes a panel section 8a and a generally flat bottom defining panel section 8b. This trunk defining panel 8 is used to define a rear trunk compartment 9. The panel section 8a of the trunk defining panel 8 extends between the wheel housings 2a and 2b, having a front end portion which is rigidly secured to a substantially intermediate portion of the raised panel portion 4b and then extends downwardly therefrom, and also has a rear end extending rearwardly to the bottom defining panel section 8b. Therefore, it is clear that a space 10 for accommodating a first fuel tank 13 is defined immediately beneath the panel section 8a and between the wheel housings 2a and 2b. The bottom defining panel section 8b of the trunk defining panel 8 is laid generally horizontally on the spaced apart side frames 1a and 1b of the frame assembly 1 with a front end portion thereof rigidly secured to a rear portion of the panel section 8a. The bottom defining panel section 8b has a tire accommodating recess 11 defined therein at a location substantially intermediate the width thereof, said recess 11 being used to accommodate a spare tire 12 therein.

Within the space 10, the first fuel tank 13 of a capacity larger than a second, generally flat fuel tank 18 as will be described later is disposed as best shown in FIGS. 2 and 3 and retained in position by means of a pair of metal bands 14a and 14b. Positioned beneath the first fuel tank 13 is a differential gear mechanism 15 of a type having an input shaft coupled drivingly with the drive shaft 6 and a pair of opposite output shafts coupled drivingly with associated rear drive wheels 17a and 17b through corresponding rear axles 16a and 16b.

As best shown in FIGS. 1 to 3 and 5, the second fuel tank 18 of a capacity smaller than the first fuel tank 13 referred to above is positioned beneath the floor panel portion 4a of the floor panel 4 and on one side with respect to the tunnel 7 and supported in position by means of a pair of metal bands 19a and 19b with its flat bottom surface confronting the ground surface on which the automobile employing the rear body structure of the present invention runs. The second flat fuel tank 18 so supported as hereinabove described is positioned at a level generally lower than the the first fuel tank 13. The first and second fuel tanks 13 and 18 are fluid-connected with each other through a fuel pipe 20 so that fuel contained within the first fuel tank 13 can be supplied to the second fuel tank 18 by the effect of a fluid head pressure while the fuel within the second fuel tank 18 can be pumped therefrom to an automotive engine system in any known manner. The first fuel tank 13 is adapted to be filled with fuel through a well-known fuel supply port 21.

Figure 5:
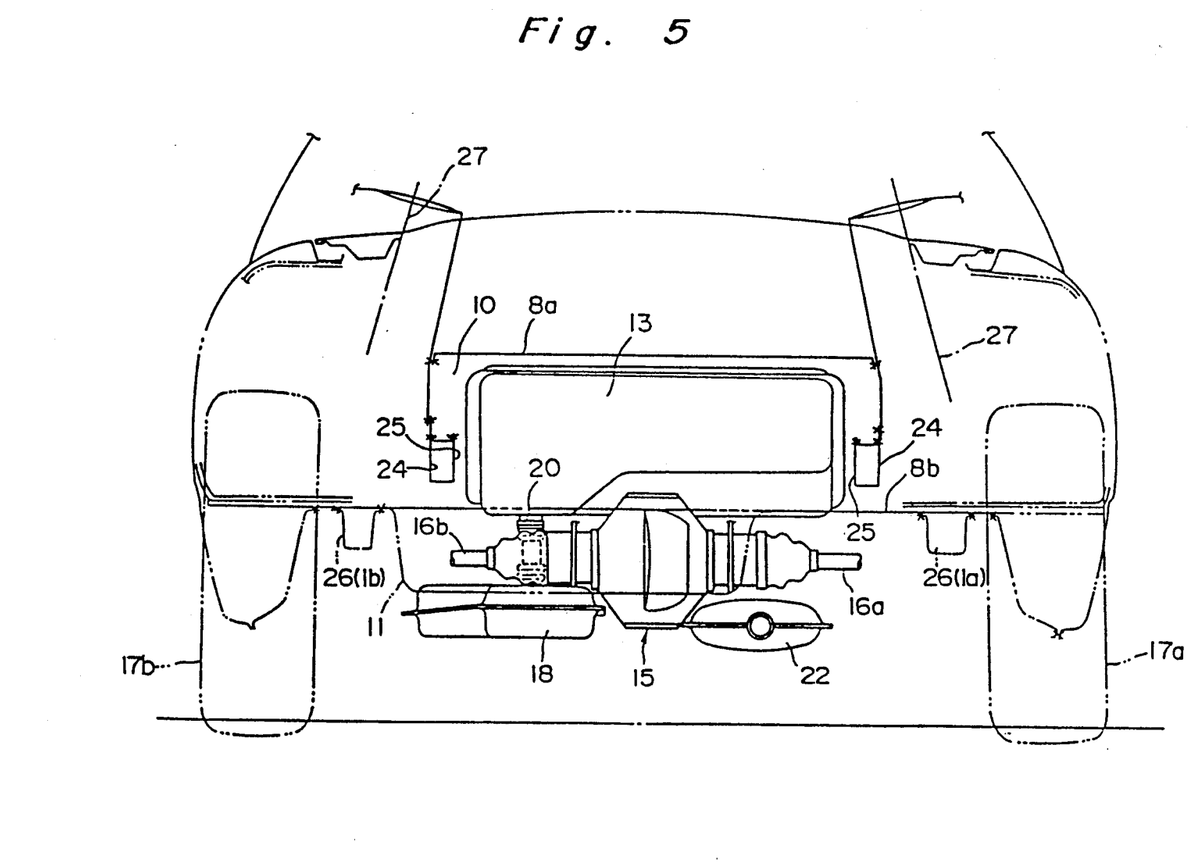
FIG. 5 is a schematic end view of the automobile rear body structure as viewed from the rear.

As best shown in FIGS. 2 and 5, disposed beneath the floor panel portion 4a of the shaped rear floor panel 4 is a pre-silencer 22, or a front-stage silencer, operable to reduce noises induced by the flow of engine exhaust gases through an automobile exhaust system. This pre-silencer is positioned on one of the opposite sides of the drive shaft 6 remote from the second fuel tank 18 and has at least one exhaust pipe 23 extending longitudinally rearwardly of the body structure on the same side as the pre-silencer 22 with respect to the drive shaft 6 as best shown in FIG. 2.

The side frames 1a and 1b are, as best shown in FIGS. 2 and 3, so arranged as to extend laterally outwardly of the opposite sides of the first fuel tank 13. In particular, each of the side frames 1a or 1b extending from respective rear end of the associated side sills 3a and 3b towards the respective rear axles 16a and 16b is bent at a location generally adjacent a front side of the associated wheel housing 2a or 2b so as to extend upwardly towards the first fuel tank 13, then is bent at a location adjacent the associated side of the first fuel tank 13 so as to extend downwardly after having traversed across the associated wheel housing 2a or 2b and along the associated side of the first fuel tank 13, and finally is bent at a location rearwardly of the associated wheel housing 2a or 2b so as to extend generally horizontally in a direction rearwardly of the body structure. That rear end portion of the respective side frame member 1a or 1b which extends generally horizontally in the direction rearwardly of the body structure is used to support the bottom defining panel section 8b of the trunk defining panel 8.

Figures 6, 7:
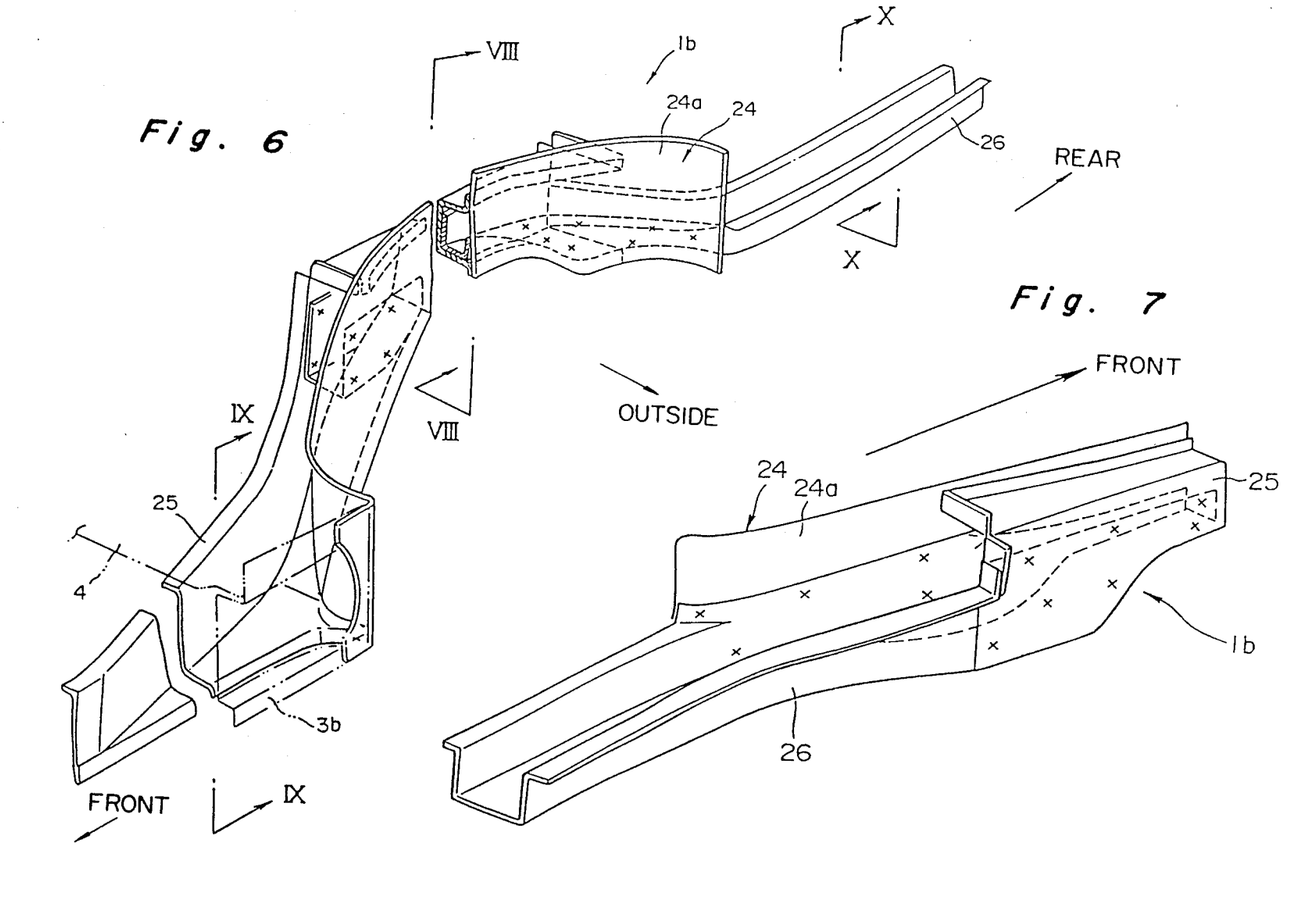
FIG. 6 is a perspective view of a right-hand side frame forming a part of a rear frame assembly used in the automobile rear body structure as viewed from the front.
FIG. 7 is a perspective view, on an enlarged scale, of a portion of the side frame shown in FIG. 6 as viewed from the rear.

Within the associated wheel housing 2a or 2b, each side frame 1a or 1b is welded to an inner surface of the associated wheel housing 2a or 2b while extending therealong as best shown in FIG. 2 and is comprised of a plurality of plate-based side frame members 24, 25 and 26 as best shown in FIG. 7.

Figure 8:
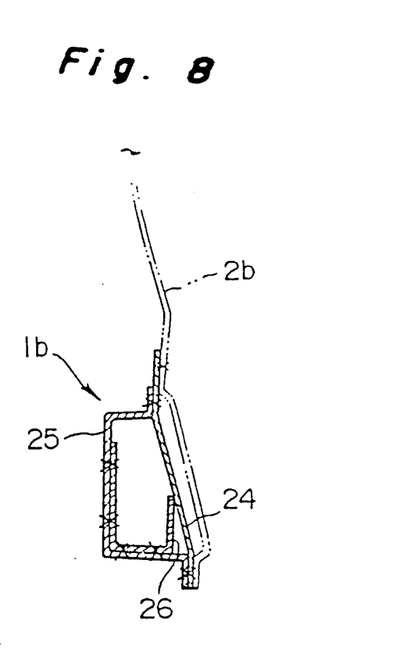
FIG. 8 is a cross-sectional view taken along line VIII—VIII in FIG. 6.
Figure 9:
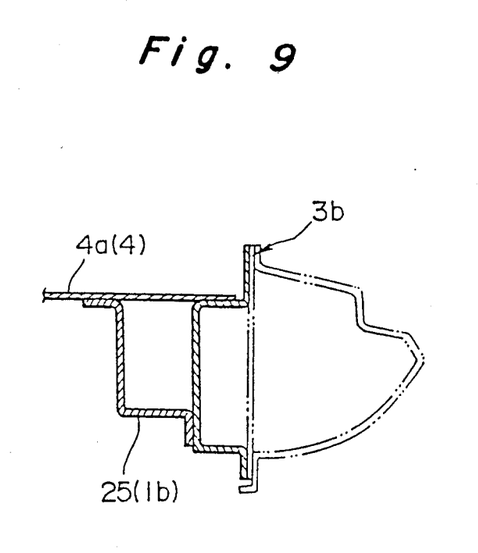
FIG. 9 is a cross-sectional view taken along line IX—IX in FIG. 6.

Referring to FIGS. 6 to 9, the details of each of the side frames 1a and 1b will now be described. It is, however, to be noted that the side frames 1a and 1b are of similar construction except that they are arranged symmetrically with respect to the longitudinal axis of the body structure and, therefore, reference will be made to only one of the side frames 1a and 1b, for example, the side frame 1b, for the sake of brevity unless otherwise specified. The side frame member 24 for the respective of the side frame 1b (or 1a) has a longitudinal wall 24a so configured as to follow the associated wheel housing 2b (or 2a). As best shown in FIG. 8, an outer side face of the side frame member 24 is welded at a location within the associated wheel housing 2b (or 2a) to the associated wheel housing 2b (or 2a) and at a location adjacent a front portion of the associated wheel housing 2b (or 2a) to the associated side sill 3b (or 3a). The side frame member 25 extends from a front end of the side frame member 24 in a direction frontwardly of the body structure and along the associated side sill 3b (or 3a) and also along the side frame member 24. As best shown in FIGS. 6 and 9, the side frame member 25 is welded to the associated side sill 3b (or 3a) at a location frontwardly of the side frame member 24 and also to the associated side frame member 24 at a location adjacent a front end of said side frame member 24. Those portions of the side frame member 25 which are welded to the associated side sill 3b (or 3a) and to the side frame member 24 serve to guide the raised floor portion 4a of the rear floor panel 4. Also, a portion of the side frame member 25 extending from a front end to a rear end of the side frame member 24 is secured to the side frame member 24, as best shown in FIGS. 6 and 7, to permit the side frame member 24 to represent a generally closed cross-section. A rear end portion of the side frame member 25 has a lower portion stepped in shape as best shown in FIG. 6.

Figure 10:
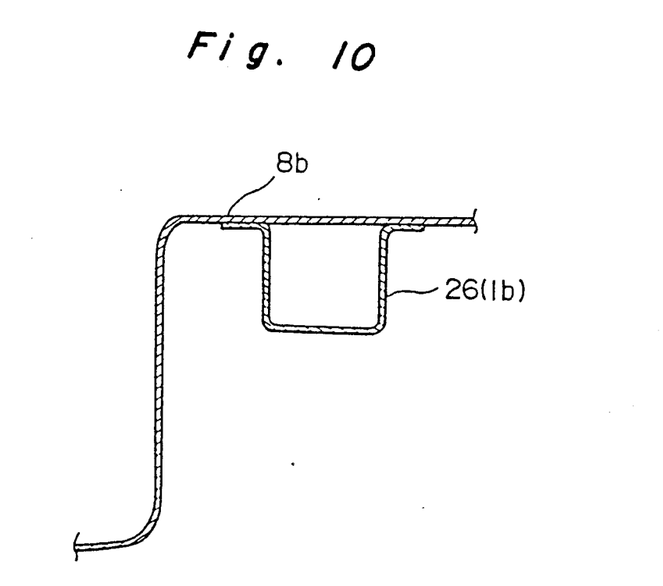
FIG. 10 is a cross-sectional view taken along line X—X in FIG. 6.

On the other hand, the side frame member 26 is of a generally U-shaped cross section opening upwardly and extends rearwardly of the body structure. This side frame member 26 has a front end portion thereof somewhat curved and inserted into a generally closed hollow delimited between and by the side frame members 24 and 25, terminating adjacent the front end of the side frame member 24. That front end portion of the side frame member 26 inserted into the generally closed hollow delimited between the side frame members 24 and 25 is welded to both of the side frame members 24 and 25 at respective locations adjacent opposite open ends of the closed hollow, whereas a rear end portion of said side frame member 26 which is positioned rearwardly of the side frame member 24 is used, as best shown in FIGS. 6 and 10, to support the bottom defining panel section 8b of the trunk defining panel 8 from below.

As is the case with the rear end portion of the side frame member 25, that portion of the side frame member 26 which enters the closed hollow delimited between the side frame members 24 and 25 is stepped in shape so as to follow the contour of the rear end portion of the side frame member 25 so that the positioning or alignment of the side frame member 24 relative to the side frame member 25 can readily be accomplished during the assembly of the respective side frame 1b (or 1a).

Figure 11:
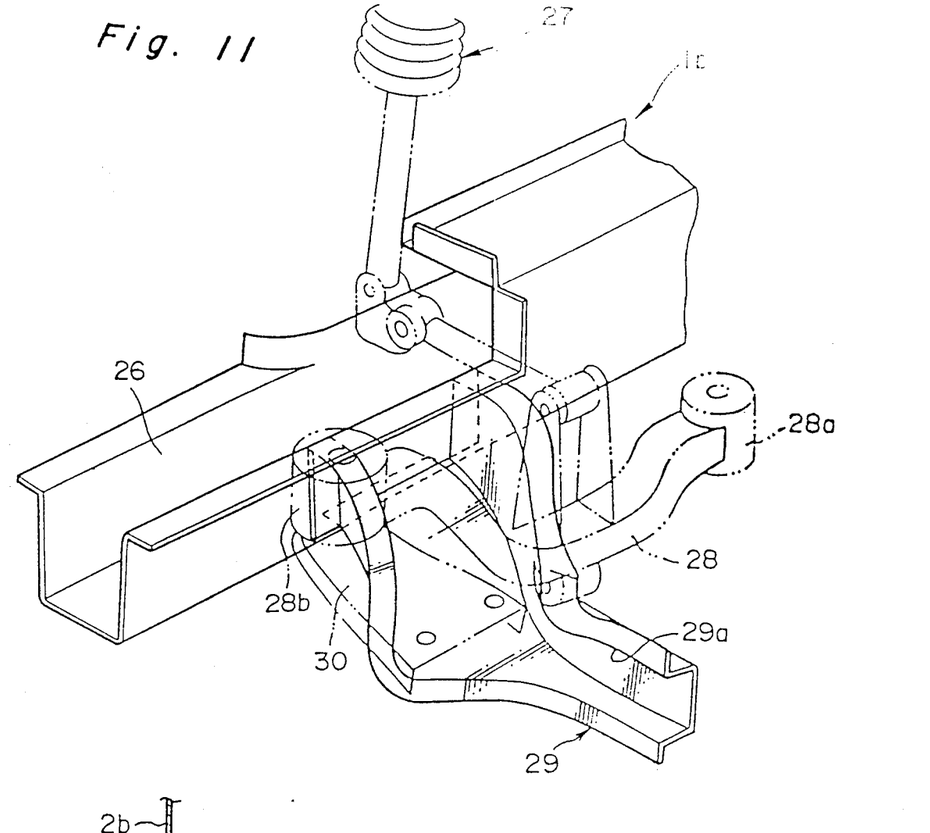
FIG. 11 is a schematic perspective view, on an enlarged scale, showing the manner in which one suspension support bracket is supported by the side frame, as viewed from the interior of the body structure.
Figure 12:
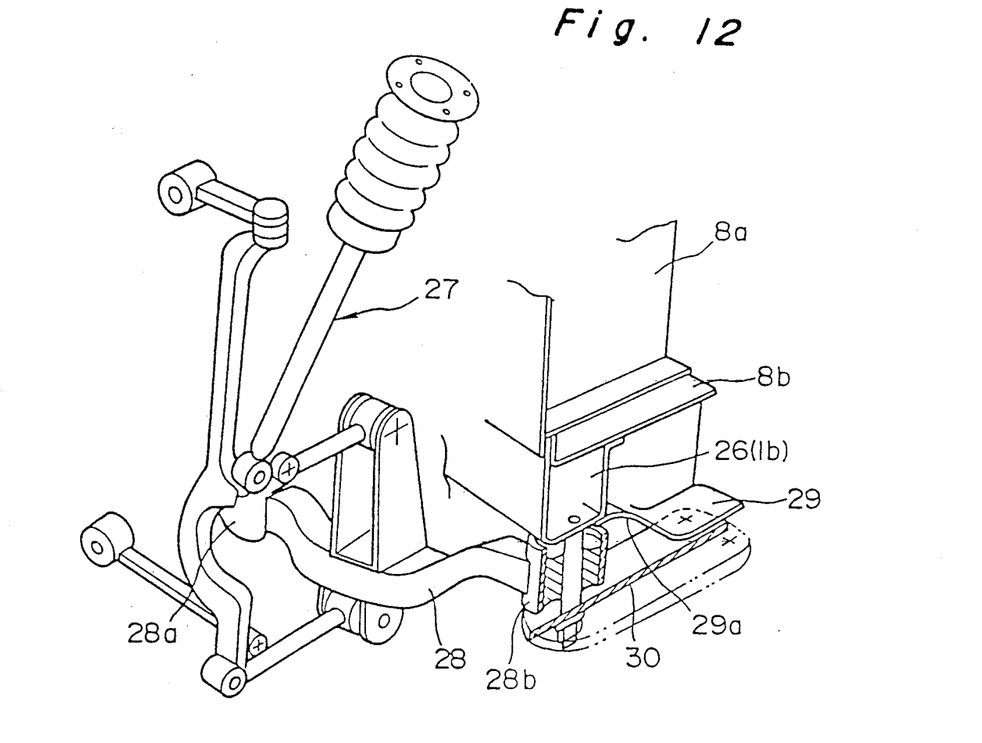
FIG. 12 is a view generally similar to FIG. 11, showing the support of the suspension support bracket by the side frame as viewed from the outside of the body structure.

As best shown in FIGS. 11 and 12, the respective side frame 1b (or 1a) is provided with a generally elongated suspension support bracket 28 for the support of a suspension system 27. This suspension support bracket 28 has opposite ends provided with respective bushings 28a and 28b which may be integral therewith and is carried by the side frame 1b (or 1a) with the bushing 28b depending from the side frame 1b (or 1a). Specifically, while the manner in which the bushing 28a of the suspension support bracket 28 is supported will be neither described nor shown for the sake of brevity, the bushing 28b of the suspension support bracket 28 is supported by a lower portion of the side frame member 26 at a location rearwardly with respect to the side frame member 25.

Figure 13:
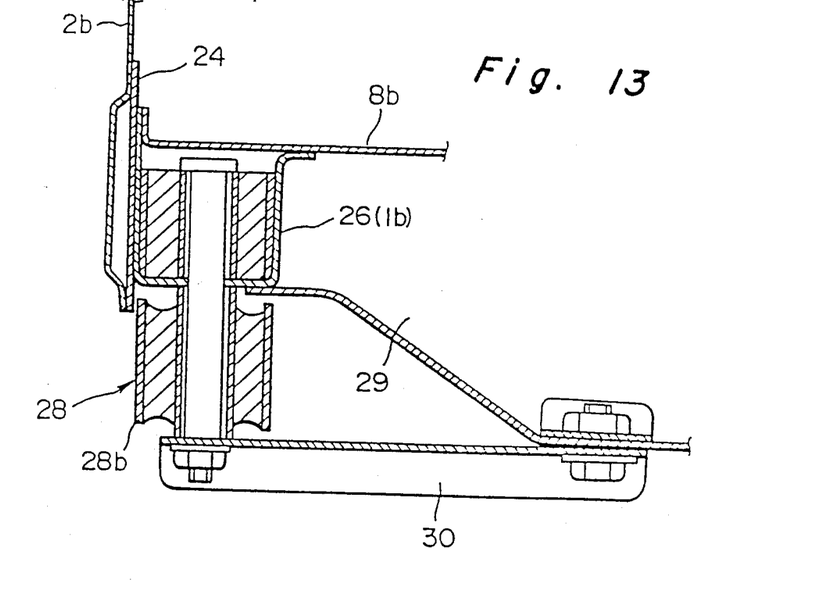
FIG. 13 is a cross-sectional view, on an enlarged scale, taken along line XIII—XIII in FIG. 4.
Figure 14:
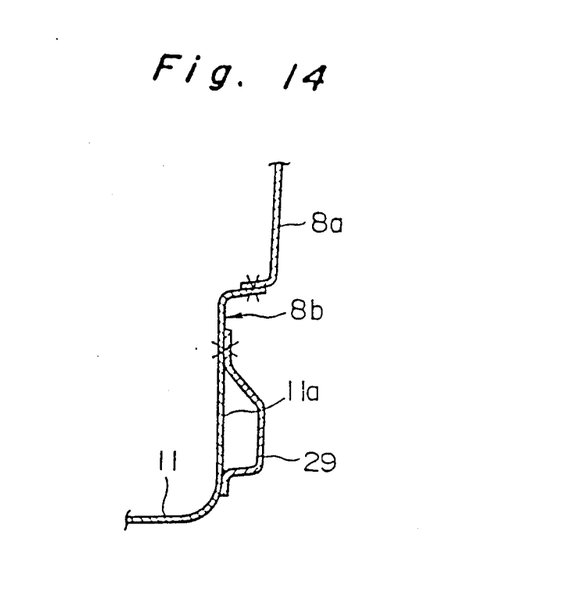
FIG. 14 is a cross-sectional view taken along line XIV—XIV in FIG. 4.

Referring to FIGS. 4 and 11 to 14, extending between the side frames 1a and 1b at a location generally below the bottom defining panel section 8b of the trunk defining panel 8 is a cross member 29 having its opposite ends rigidly connected to the opposite side frame members 26 for the respective side frames 1a and 1b so as to confront the bushings 28b of the opposite suspension support brackets 28. This cross member 29 is of a generally U-shaped cross-section opening at 29a and has end portions opposite to each other which are, as best shown in FIGS. 4, 12 and 13, welded to an undersurface of the bottom defining panel section 8b of the trunk defining panel 8 in a manner well known to those skilled in the art. A substantially intermediate portion of the cross member 29 confronting a side wall 11a defining the spare tire accommodating recess 11 is so twisted relative to the opposite end portions thereof that the opening of such intermediate portion of the cross member 29 confronts the side wall 11a of the spare tire accommodating recess 11.

Due to the twisted configuration of the generally intermediate portion of the cross member 29 relative to the opposite end portions thereof, as best shown in FIG. 4, the opposite end portions of the cross member 29 which lie between the side wall 11a and the associated side frames 1a and 1b, respectively, are inclined a predetermined direction relative to the twisted intermediate portion thereof so as to extend rearwardly of the body structure. In order to effectively provide a rigidity for a given load imposed on the cross member 29, this direction of inclination of each of the opposite end portions 29b of the cross member 29 is preferably so selected as to conform to the inclination in a direction rearwardly of the body structure (as shown by single-dotted phantom lines in FIG. 4) necessitated by the inclination of each suspension system 27 in a direction inwardly of the widthwise direction of the body structure.

It is to be noted that reference numeral 30 represents a reinforcement stay supported between the side frame member 26 of each of the side frames 1a and 1b and the adjacent end of the cross member 29.

Thus, according to the foregoing preferred embodiment of the present invention, the rear floor panel 4 is of one-piece construction including the raised panel portion 4b and the rear package tray portion 4c and, therefore, the rigidity of a shielding plate constituted by the raised rear panel portion 4b and the rear package tray portion 4c can be advantageously increased enough to substantially eliminate the possibility that, in the event that the fuel tank 13 is damaged as a result of the automobile collision, fuel may leak into a vehicle compartment R.

The one-piece construction of the rear floor panel 4 including the raised panel portion 4b and the rear package tray portion 4c effectively eliminates the necessity of those elements to be separately assembled and installed, thereby facilitating an assembly of the vehicle body structure.

For accommodating the second, flat fuel tank 18, the present invention maximizes the utilization of a space found in any type of existing vehicle at a location beneath the floor panel portion 4a of the rear floor panel 4 on which portion 4a is mounted the rear passengers seat assembly. Accordingly, the second, flat fuel tank 18 can be installed in a small-sized automotive vehicle where such space is available. The use of two fuel tanks, the first and second fuel tanks 13 and 18, enables the automotive vehicle to carry a substantially increased amount of fuel regardless of the size of the automotive vehicle and, hence, enables the automotive vehicle to be driven continuously over an increased distance.

In the practice of the present invention, while the first fuel tank 13 may be of a standard capacity required for the automotive vehicle to be operated continuously over a reasonable distance, the second fuel tank 18 may be utilized for a supplementary purpose relative to the first fuel tank 13 and, therefore, the second fuel tank 18 need not be of a relatively large capacity. Therefore, the second fuel tank 18 can be advantageously so structured and so configured as to have a generally flat shape enough to permit it to be installed beneath the floor panel portion 4a of the rear floor panel 4 while a sufficient height is secured above the ground surface and below the bottom face of the second fuel tank 18.

The installation of the second fuel tank 18 and both of the pre-silencer 22 and the exhaust system 23 beneath the floor panel portion 4a of the rear floor panel 4 and on the respective sides of the drive shaft 6 with respect to the widthwise direction of the body structure, such as accomplished in the present invention, does not constitute an obstruction to the conventional utilization of the space.

Also, according to the foregoing preferred embodiment of the present invention, the side frames 1a and 1b of the frame assembly 1 are in part welded to the respective wheel housings 2a and 2b while having been so configured as to extend along the curved portions of the respective wheel housings 2a and 2b and, therefore, the wheel housings 2a and 2b are advantageously backed up by the associated side frames 1a and 1b to exhibit a substantially increased rigidity, permitting the wheel housings 2a and 2b to have sufficient physical strength to withstand the load which may be imposed by, for example, the associated suspension systems 27.

Because each of the side frames 1a and 1b of the frame assembly 1 is constituted by the separate side frame members 24 to 26, the respective side frame 1a and 1b can readily and with no difficulty be shaped to follow the complicated curved shape of the associated wheel housing 2a and 2b as the side frame members 24 to 26 forming the respective side frame 1a and 1b are individually formed to have respective shapes which, when the side frame members 24 to 26 are assembled together, represent a shape conforming to the complicated curved shape of the associated wheel housing 2a and 2b.

Furthermore, according to the foregoing preferred embodiment of the present invention, with the side frames 1a and 1b so structured and so installed as hereinabove described, the side frames 1a and 1b extend across the respective positions where the suspension support brackets 28 for the support of the associated suspension systems 27 are installed, and therefore, the suspension support brackets 28 can be advantageously supported by the respective side frames 1a and 1b. This system of support allows the side frames 1a and 1b to be utilized as rigid supports for the suspension support brackets 28, permitting the latter to be rigid relative to the associated suspension systems 27. Consequently, the side frames 1a and 1b employed in the practice of the present invention can effectively support greater loads than those imposed by conventional suspension systems.

Moreover, the cross member 29 is so shaped and so positioned that flanges of a generally intermediate portion of the cross member 29 adjacent the recess defining side wall 11a are rigidly secured to the recess defining side wall 11a, and flanges of the opposite end portions of the cross member 29, which are twisted relative to the generally intermediate portion thereof, are rigidly secured to the undersurface of the panel section 8b from below, with the opening 29a of the cross member 29 substantially closed by the panel section 8b and the recess defining side wall 11a. Because of this, the direction in which welding is performed to secure the flanges of the generally intermediate portion of the cross member 29 to the recess defining side wall 11a and the direction in which welding is performed to secure the flanges of each of the opposite end portions of the cross member 29 to the undersurface of the panel section 8b are so differentiated from each other that the panel section 8b can have imparted thereto substantially increased rigidity sufficient to withstand a twisting force acting in all directions. This in turn results in an increase of the physical strength against the loads imposed by, for example, the suspension systems 27.

Referring now to FIGS. 15 to 18, there is shown a second preferred embodiment of the present invention. This second preferred embodiment of the present invention is specifically designed to provide a difference in a rigidity between rear and front end portions of the side frame assembly so that the transmission of a force, imposed on the rear body structure in the event of an end-to-end automobile collision, to the fuel tank can be advantageously minimized.

Figures 15, 17, 18:
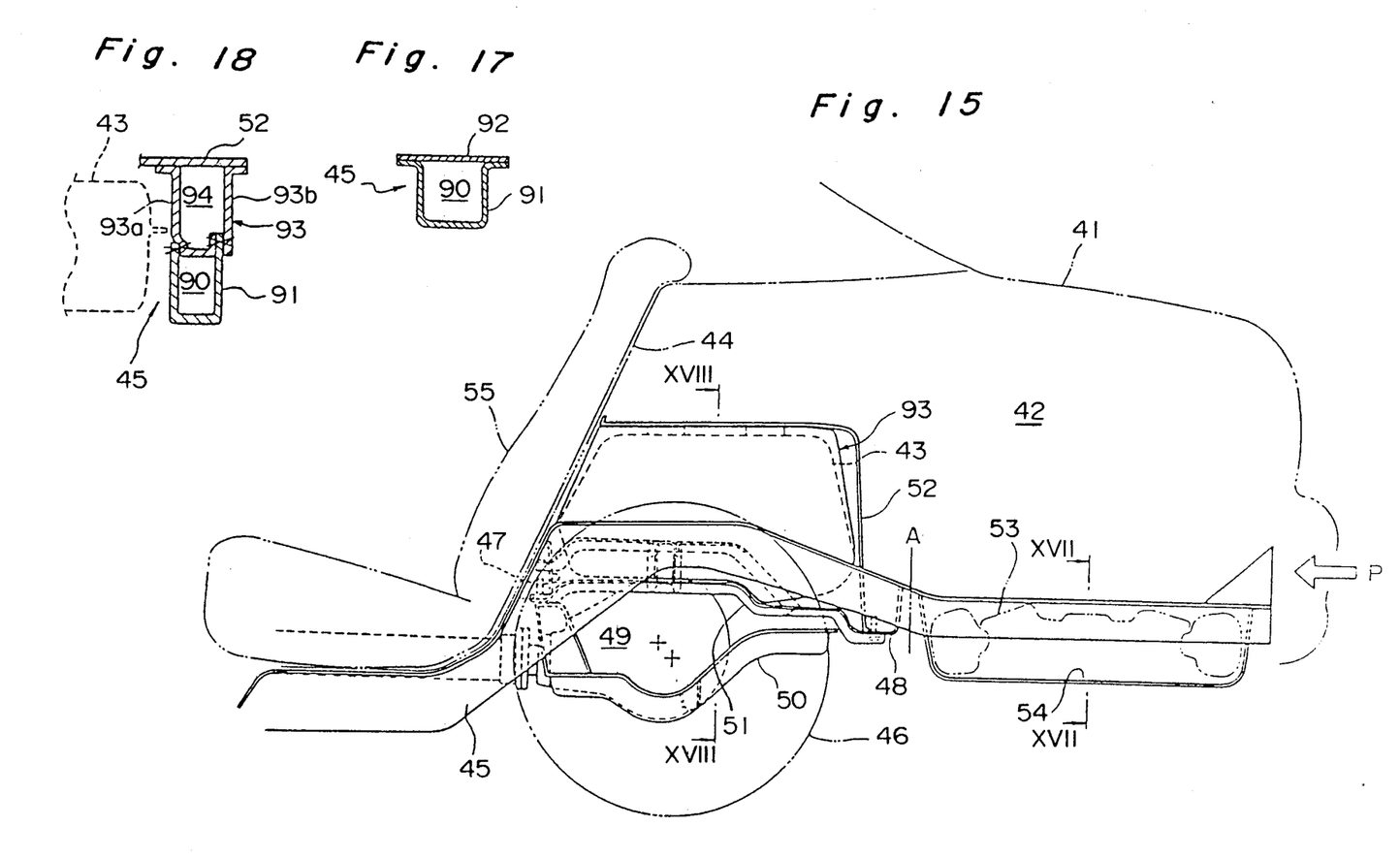
FIG. 15 is a view similar to FIG. 3, showing the automobile rear body structure according to a second preferred embodiment of the present invention.
FIGS. 17 and 18 are cross-sectional views taken along lines XVII—XVII and XVIII—XVIII in FIG. 15, respectively.
Figure 16:
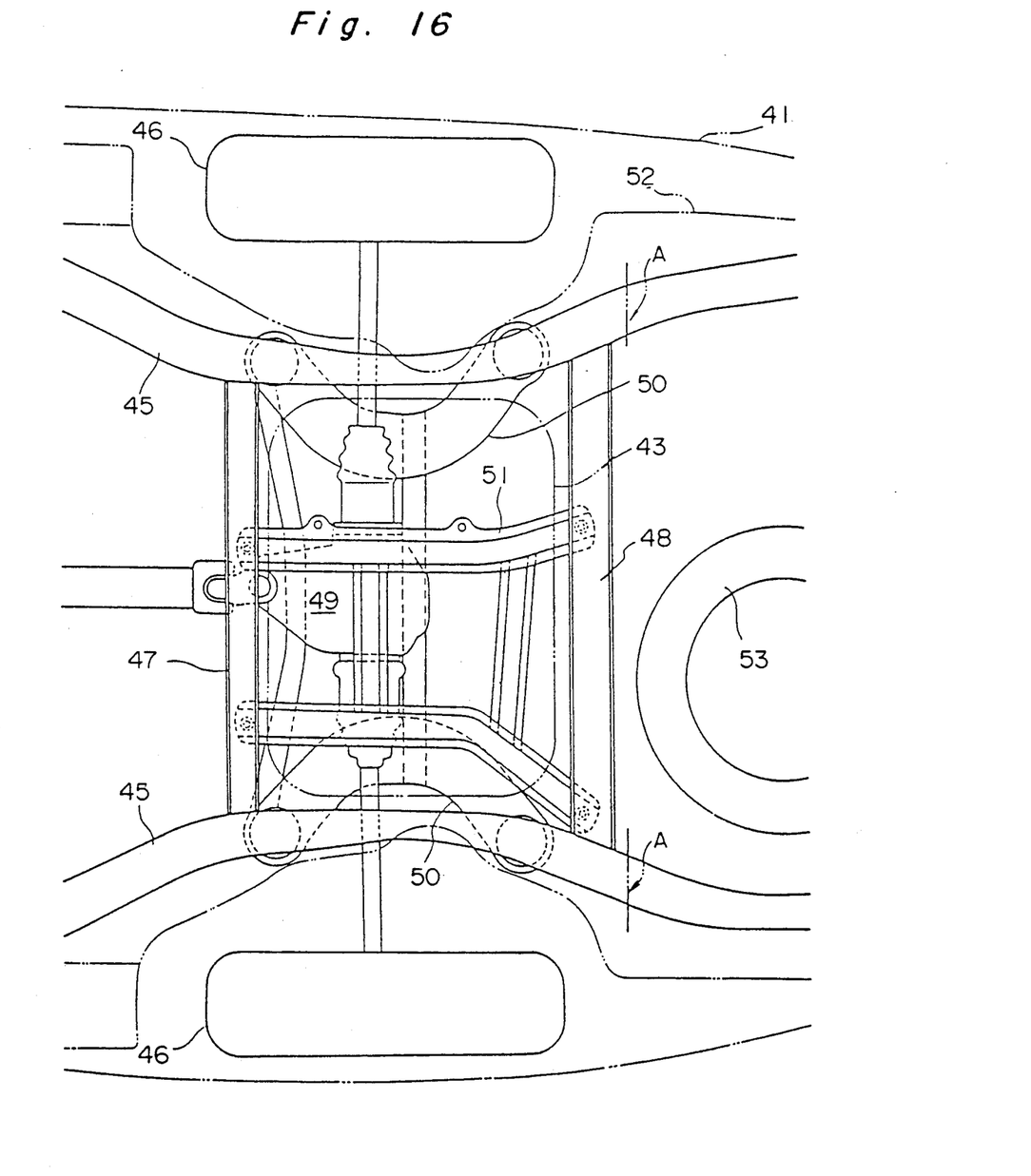
FIG. 16 is a view similar to FIG. 2, showing the automobile rear body structure according to the second preferred embodiment of the present invention.

Referring first to FIGS. 15 and 16, an automobile rear body structure is generally identified by 41 and includes a fuel tank 43 positioned rearwardly of a rear floor panel 44, particularly a raised panel portion thereof for the purpose of maximizing the capacity of a rear trunk compartment 42. Also, the rear body structure includes a rear frame assembly extending longitudinally of the body structure and constituted by left-hand and right-hand side frames of substantially identical construction generally identified by 45, each of said frames 45 being so designed and so shaped as to have a generally intermediate portion upwardly raised at a location where an associated rear wheel is positioned, with a respective front end portion extending beneath a rear passengers seat assembly 55 while a respective rear end portion extends generally horizontally at a relatively low height above the ground surface on which the automobile runs. More specifically, each of the side frames 45 has a generally horizontally extending front end portion immediately beneath the seat assembly 55, a rearwardly upwardly inclined portion continued from the horizontally extending front end portion so as to extend a predetermined distance along the raised panel portion of the rear floor panel 44, a rearwardly downwardly inclined portion continued from the rearwardly upwardly inclined portion, and a generally horizontally extending rear end portion continued from the rearwardly downwardly inclined portion and positioned on a respective side of a spare tire recess 54 for accommodating a spare tire 53.

The rearwardly upwardly and downwardly inclined portions of each of the side frames 45 are located where the associated rear wheel 46 is operatively housed. Those side frames 45 are spacedly connected together by means of a front cross member 47, having its opposite ends rigidly secured to the respective rearwardly upwardly inclined portions of the associated side frames 45, and a rear cross member 48 having its opposite ends rigidly secured to the respective rearwardly downwardly inclined portions of the associated side frames 45, both of said front and rear cross members 47 and 48 extending in a direction widthwise of the body structure 41.

A differential gear mechanism 49 of any known construction and rear suspension systems (not shown) are arranged in a space delimited beneath the fuel tank 43 and between the rearwardly upwardly and downwardly inclined portions of one side frame 45 and those of the other side frame 45 and are supported in position by rear suspension cross members 50, one engaged at opposite ends thereof to one side frame 45 and the other engaged at opposite ends thereof to the other side frame 45. The fuel tank 43 positioned behind the seat back of the rear passengers' seat assembly 55 is also positioned generally above the differential gear mechanism 49 and steadily mounted on a pair of tank mount members 51 extending generally longitudinally of the body structure 41 in widthwise spaced relationship with each other, each of said tank mount members 51 having its opposite ends rigidly secured to the front and rear cross members 47 and 48.

As is the case with the foregoing embodiment of the present invention, the fuel tank 43 so supported as hereinabove described is covered by a shaped trunk defining panel 52 that is positioned rearwardly of the raised panel portion of the floor panel 44 and that includes an overlay panel section, overlaying the fuel tank 43, and a generally flat bottom defining panel section in which the spare tire recess 54 is defined.

In order for each of the side frames 45 to have different portions having a different sectional stiffness, a region of each side frame 45 including the horizontally extending front end portion and the rearwardly upwardly and downwardly inclined portions is designed to have a sectional stiffness lower than that of the generally horizontally extending rear end portion of the respective side frame 45. The boundary between the region of lower sectional stiffness in each side frame 45 and the region of higher sectional stiffness in the respective frame 45 is shown by phantom lines A in FIGS. 15 and 16 and may be located in the vicinity of the point of bend between the rearwardly downwardly inclined portion and the horizontally extending rear end portion of the respective side frame 45. This can be accomplished by the selection of the front region of each side frame 45, including the horizontally extending front end portion and the rearwardly upwardly and downwardly inclined portions thereof, to have a modulus of section greater than that of the rear region of the respective side frame 45 including the horizontally extending rear end portion thereof, the selection of the front region of each side frame 45 to have a wall thickness greater than that of the rear region of the respective side frame 45, or the use of a reinforcement members to be secured to the front region of each side frame 45, or a combination thereof.

FIG. 17 illustrates a cross-section of the rear region of each side frame 45 taken along the line XVII—XVII in FIG. 15. As best shown therein, the rear region of each side frame 45 is comprised of a generally U-sectioned frame member 91 opening upwardly and having laterally outwardly extending flanges, and a flat plate member 92 mounted on the U-sectioned frame member 91 so as to close the opening of the frame member 91 with the flanges welded thereto. thereby permitting the rear region of the respective side frame 45 to have a generally closed hollow 90 with a lower portion of the frame member 91 exhibiting an increased rigidity.

On the other hand, FIG. 18 illustrates a cross-section of the front region of the respective side frame 45 taken along the line XVIII—XVIII in FIG. 15. As best shown therein, the front region of each side frame 45 is similar in construction to the rear region of the respective side frame 45 shown in FIG. 17, except that the frame member 91 is of a generally U-sectioned shape having no flange and that the frame member 91 is secured rigidly to an associated lateral side portion of the overlay panel section of the trunk defining panel 52 through a torque box 93. As illustrated, the torque box 93 comprises a generally L-sectioned frame member 93a having a vertical wall and a horizontal wall, and a generally flat plate member 93b opposite to the vertical wall. This torque box 93 is intervened between the associated lateral side of the overlay panel section of the trunk defining panel 52 and the frame member 91 with the horizontal wall of said L-shaped frame member 93a received in and welded to the frame member 91 so as to define a generally closed hollow 90 between them while the flat plate member 93b is welded at an upper side to the undersurface of the overlay panel section of the trunk defining panel 52 and at a lower side exteriorly to the frame member 91 so as to define a generally closed hollow 94 delimited by the L-shaped frame member 93a, the overlay panel section of the trunk defining panel 52 and the flat plate member 93b.

Thus, it will readily be understood that a difference in rigidity is provided between the respective front regions of the side frames 45 and the respective rear regions of the same side frames 45 and, therefore, in the event that, as a result of an end-to-end automobile collision in which the front of one automobile collides against the rear of another automobile, an excessive impact is applied to the rear of the automobile, the side frames 45 can be effectively buckled generally at the boundary A between the region of lower sectional rigidity in each side frame 45 and the region of higher sectional rigidity in the respective frame 45, thereby minimizing the transmission of the impact towards the fuel tank 43 and other parts of the automobile body structure which are positioned frontwardly of the boundary A.

It is to be noted that, in the rear region of each of the side frame 45, the generally U-sectioned frame member 91 is positioned below the flat plate member 92 and, therefore, the rear region of the respective side frame 45 can exhibit an increased rigidity at a lower region of the closed hollow 90 delimited by the frame member 91 and the flat plate member 92. In view of this, even though the impact resulting from the end-to-end automobile collision is applied to the rear body structure at a point shown by the arrow P in FIG. 15 higher than the level of the boundary A in each side frame 45, each side frame 92 can be positively buckled in a direction close towards the flat plate member 92, that is, upwardly, thereby avoiding the possibility of the front region of the rear frame assembly being damaged.

In view of the foregoing, according to the second preferred embodiment of the present invention, any possible deformation of the rear suspension systems and their surroundings, including the fuel tank 43 positioned between the rear suspension systems, can be advantageously minimized.

The presence of the difference in rigidity between the front and rear regions of each side frame effectively facilitates a buckling of the respective side frame to take place about the boundary therebetween, thereby to minimize damage which would otherwise extend towards the front of the automobile body structure and also to minimize damage to the suspension systems which would otherwise be deformed to such an extent as to result in a difficulty in restoring the suspension geometry. Important of all is that, according to the present invention, any possible damage to the fuel tank can also be minimized advantageously.

Although the present invention has been fully described in connection with the preferred embodiments thereof, it is to be noted that various changes and modifications are apparent to those skilled in the art. By way of example, the rear end portion of each side frame employed in the first preferred embodiment of the present invention can be structured in a manner similar to that described and shown in connection with the second preferred embodiment of the present invention.

Also, an idea of use of the second flat fuel tank envisaged in the first embodiment of the present invention can be equally applicable to the second embodiment of the present invention.

Again, in describing the automobile rear body structure according to any one of the foregoing embodiments, each of the side frames forming the rear frame assembly has been shown and described as having a raised portion clear from the associated rear wheel axle. However, in a broad aspect of the present invention, the latter can be equally applicable to the rear frame assembly wherein each side frame may extend generally horizontally in a direction longitudinally of the automobile body structure, having no substantially raised portion such as shown and described.

Accordingly, such changes and modifications are to be understood as included within the scope of the present invention as defined by the appended claims, unless they depart therefrom.

What is claimed is:

1. An automobile rear body structure comprising:
   a rear floor panel including:
   a floor panel portion for supporting a rear passenger seat assembly;
   an upwardly raised panel portion continued from said floor panel portion so as to extend generally rearwardly upwardly therefrom and contoured to extend along and behind a seat back of the rear passenger seat assembly; and
   a rear package tray portion continued rearwardly from said upwardly raised panel portion so as to extend generally horizontally at a level above said floor panel portion;
   at least one fuel tank positioned behind said raised panel portion and beneath said rear package tray portion of said rear floor panel;
   a pair of spaced rear side frames extending longitudinally of the body structure, each said rear side frame including:
   a substantially horizontally extending front portion connected to said floor panel portion of said rear floor panel;
   a substantially intermediate portion having a generally rearwardly upwardly inclined section continued rearwardly from said front portion and a generally rearwardly downwardly inclined section continued rearwardly from said rearwardly upwardly inclined section, said intermediate portion being positioned laterally outwardly of and adjacent a respective side of said fuel tank and protecting said fuel tank from damage in the event the automobile is struck from the side; and a substantially horizontally extending rear portion continued rearwardly from said intermediate portion;

a pair of suspension systems, each said suspension system being positioned laterally outwardly of and adjacent said intermediate portion of the respective said rear side frame; and each said intermediate portion of said rear side frame having a higher sectional stiffness than said rear portion of said rear side frame thereby defining means for protecting the respective said suspension system from damage in the event the automobile is struck from the rear.

2. A rear body structure as claimed in claim 1, further comprising a trunk defining panel positioned rearwardly of said raised panel portion of said rear floor panel and including a front panel section rigidly fixed to a substantially intermediate portion of said raised panel portion of said rear floor panel and extending rearwardly horizontally therefrom, an intermediate panel section continued from said front panel section and extending downwardly therefrom, and a rear panel section continued from said intermediate panel section and extending horizontally therefrom, said fuel tank being accommodated in a space formed by said raised panel portion of said rear floor panel and by said front panel section and said intermediate panel section of said trunk defining panel.

3. A rear body structure as claimed in claim 2, wherein said rear portion of each said rear side frame is fixed to said rear panel section of said trunk defining panel.

4. A rear body structure as claimed in claim 3, further comprising wheel housings connected to respective said side frames, with said intermediate portion of each said side frame being secured to a side wall of a respective said wheel housing.

5. A rear body structure as claimed in claim 1, further comprising an additional fuel tank of generally flat configuration having a capacity smaller than that of said at least one fuel tank, said additional fuel tank being supported generally below said floor panel portion of said rear floor panel and on one side with respect to the width of the body structure.

6. A rear body structure as claimed in claim 1, further comprising wheel housings connected to respective said rear side frames, with said intermediate portion of each said rear side frame being secured to a side wall of a respective said wheel housing.

7. A rear body structure as claimed in claim 1, further comprising a differential gear mechanism positioned beneath said at least one fuel tank.

* * * * *